United States Patent [19]

Krueger

[11] 3,990,919
[45] Nov. 9, 1976

[54] BATTERY ADAPTER
[76] Inventor: Ralph A. Krueger, 820 Appalache Ave., Winter Park, Fla. 32789
[22] Filed: Dec. 31, 1974
[21] Appl. No.: 537,774

[52] U.S. Cl. .............................................. 429/100
[51] Int. Cl.² ......................................... H01M 2/10
[58] Field of Search ............................. 136/166, 173

[56] References Cited
UNITED STATES PATENTS
| | | | |
|---|---|---|---|
| 2,397,469 | 4/1946 | Casanov | 136/173 |
| 2,876,273 | 3/1959 | Hall | 136/173 |
| 3,684,583 | 8/1972 | Lehnen et al. | 136/173 |

Primary Examiner—Donald L. Walton
Attorney, Agent, or Firm—Julian C. Renfro

[57] ABSTRACT

An adapter for a battery, involving a case whose hollow interior is adapted to receive therein a small AA size or C size battery, and whose exterior is of a standard size, such as a D size dry cell, thus enabling the adapter, with battery therein, to be used as a convenience and an expedient substitute in lieu of the larger battery in a flashlight, portable tape recorder, electrically powered toy, or the like.

8 Claims, 10 Drawing Figures

BATTERY ADAPTER

BACKGROUND

It is of course well known that most flashlights are equipped with dry cells, with one or more of such dry cells being utilized for causing the bulb of the flashlight to be energized when the switch of the flashlight is operated. Flashlights are designed to accommodate different numbers of dry cells, with perhaps the most popular size being the two cell flashlight.

It is also well known that these dry cells can be of many sizes, among them AA size, C size or D size, with the AA size also being known as the penlight battery, the C size frequently being utilized for powering children's toys as well as tape recorders, and the D size being the most popular size for flashlights and many other devices.

There are many instances, particularly just after Christmas, when the typical householder will find he has too many penlight batteries and size C batteries on hand, but too few size D cells for his flashlight. It is for reasons such as this that I provide in accordance with this invention, a means making it possible for batteries of the smaller size to be effectively used in flashlights and in other devices requiring larger batteries, such as size D dry cells.

As will become obvious, I do not change the number of cells utilized in a given flashlight or other appliance, but by this invention I provide a novel adapter with standard external characteristics to contain the smaller size dry cells so that they can be used dependably and effectively in devices heretofore useable only with the larger size cells.

SUMMARY

In accordance with a preferred form of this invention, I utilize an adapter unit comprising base portion and cap, with the base portion having an outside diameter the same as a D cell, and with the combined length of base and cap being the same as a D cell. The interior of the base portion is hollow, and of a size to accommodate a smaller size cell, such as an AA cell or C cell, thus making it possible to use these smaller sizes in applications ordinarily requiring a D cell.

It is of obvious importance that my novel adapter unit make contact with both terminals of the dry cell it contains, as well as with the components with which it is to be placed in external contact. To this end I provide terminals in both ends of my adapter case, with at least one of these preferably being a "floating" contact, so that slight external forces applied to the end terminals will ensure electrical continuity with the smaller cell inside at all times when my novel adapters are in use in flashlights, tape recorders, toys, and the like.

It is therefore a primary object of this invention to provide a novel dry cell adapter unit, making it possible for dry cells of small size to be effectively utilized in flashlights, appliances and the like that were originally intended for use with dry cells of a larger size.

It is another object of this invention to provide novel, reusable adapter units for dry cells, with the exterior of each adapter unit being standardized to the size of a large dry cell, but with the interior being configured such that a dry cell of small size may be accommodated therein and effectively used.

It is yet another object of my invention to provide an economical adapter case making possible the use of small dry cells in locations originally designed for large dry cells, with terminals being provided top and bottom in such adapter case as to normally assure proper electrical continuity through the case, but with provision being made in accordance with one embodiment of this invention for preventing electrical continuity in the event the small dry cell is turned the wrong direction in the adapter case.

It is still another object of my invention to provide a novel adapter case of the type described, in which at least one novel, slidable terminal is being utilized in the case in order to make it possible for electrical continuity to be achieved, despite variations in the manner in which the components constituting the adapter case interfit.

These and other objects, features and advantages will be more apparent from a study of the appended drawings in which FIG. 1 is a side elevational view of a typical two cell flashlight with a portion removed in order to reveal therein the use of my novel adapters equipped with small batteries, rather than a flashlight utilizing the size batteries for which it was designed;

Figure 7:
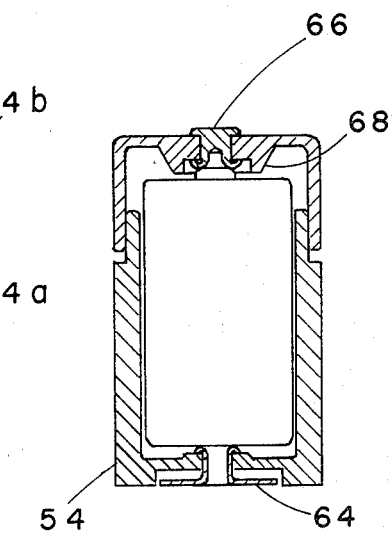
FIG. 7 is a cross-sectional view of an embodiment of my invention in which the internal terminal arrangement is such that a circuit will not be completed through the adapter unless the positive terminal of the battery abuts the upper contact of the adapter in the manner shown in this figure.
Figure 10:
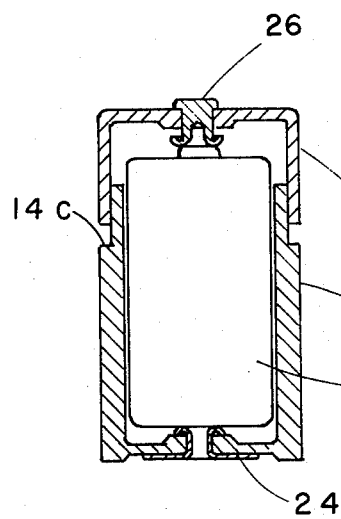
Figure 9:
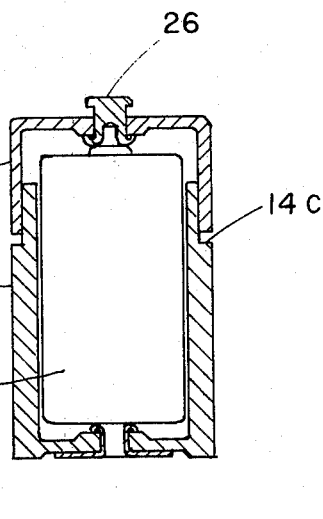
Figure 8:
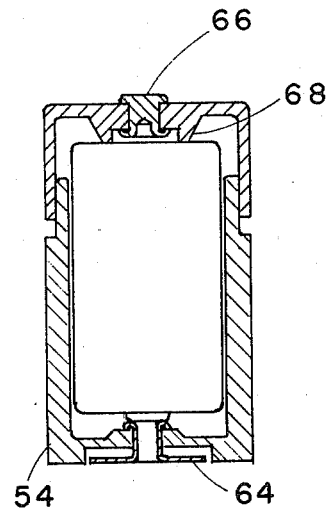

FIG. 8 is a cross-sectional view relatable with the showing of FIG. 7, with the battery in this instance turned the wrong direction, and therefore with no part of the battery making proper electrical contact with the upper terminal of the adapter; and FIGS. 9 and 10 are relatable figures, each showing an embodiment of this invention in which the upper contact is slidable in such a manner as to assure electrical continuity between the terminals of the battery and the exterior of the adapter over a wide range of interfitting conditions between the cap and the base portions of my novel adapter.

DETAILED DESCRIPTION

Figure 1:
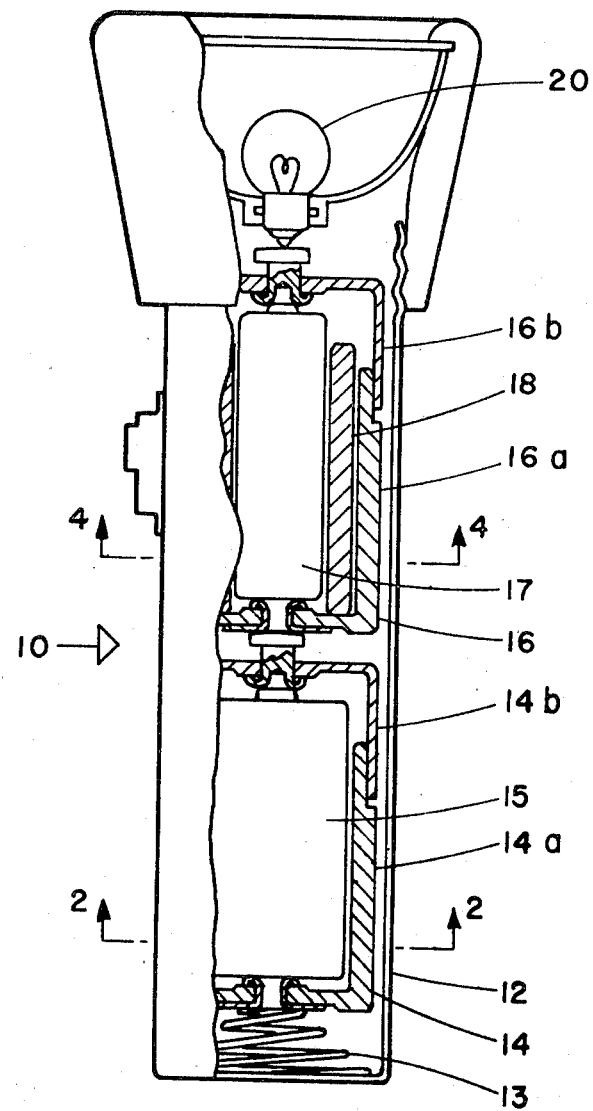

Turning to FIG. 1, it will be seen that I have shown a typical two cell flashlight 10, with certain portions removed in order to reveal internal construction. The holder 12 of this flashlight is of a length and diameter as to accommodate two size D flashlight batteries, but in this exemplary embodiment, it instead contains a pair of battery adapters 14 and 16 configured in accordance with this invention. These adapters make it possible for a pair of AA size batteries, a pair of C size batteries, or, as here, one of each of these battery sizes to be utilized in order to supply current to the bulb 20, to bring about the desired incandescent condition therein. A conventional spring 13 in the bottom of the flashlight holder 12 pushes the adapters 14 and 16 toward the bulb 20, and thus assures electrical continuity between the batteries 15 and 17, the upper and lower terminals of the adapters 14 and 16, and the base of the bulb.

Continuing with the description of FIG. 1, the size C dry cell 15 is utilized in adapter 14, whereas the size AA drycell 17 is utilized in the adapter 16. The battery voltage is the same for all of the mentioned sizes, 1.5 volts, but by virtue of my invention, it is possible to utilize batteries of these other sizes quite effectively in a flashlight primarily intended for D cells.

Figure 2:
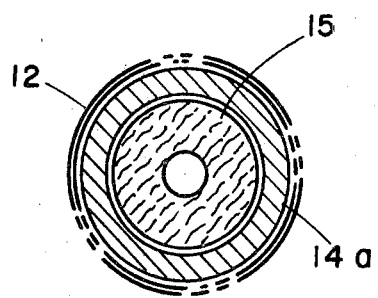
FIG. 2 is a cross-sectional view taken along section lines 2—2 in FIG. 1.
Figure 5:
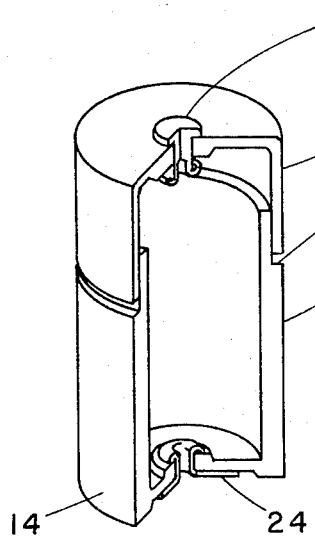
FIG. 5 is a perspective view of an adapter designed to enable a size C drycell to be used in lieu of a size D drycell, with a portion of the adapter being removed to reveal internal construction.

Referring to the adapter 14, which is visible in FIG. 1 as well as in FIGS. 2 and 5, this consists of a lower or base member 14a designed to contain most of the size C cell, with a cap portion 14b being snugly yet removably pressed onto the upstanding shoulder of the lower portion thereof. As will be apparent, after the cap 14b is properly in place on the principal or base portion of the adapter, the size of the outer portion of this adapter is almost identical to that of a size D drycell, from the standpoints of both overall length and diameter. The interior of the adapter 14 is of a size to easily accommodate therein a smaller battery, in this instance the C battery 15, with the upper and lower terminals of the battery making appropriate electrical contact with terminal portions in the adapter, as will hereinafter be discussed.

Figure 4:
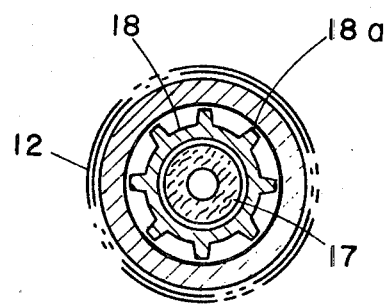
FIG. 4 is a cross-sectional view taken along section lines 4—4 in FIG. 1, revealing that the use of the fluted sleeve permits the employment of a penlight battery in an adapter not originally sized for such battery.
Figure 3:
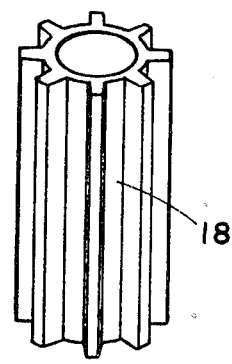
FIG. 3 is a perspective view of the fluted sleeve that may be used in an adapter in accordance with this invention when the battery available for use is smaller than the size for which the adapter was designed.

Adapter 16, located directly above adapter 14 in FIG. 1, is virtually identical to adapter 14 in that it comprises a base or principal portion 16a and a cap portion 16b. However, it differs from adapter 14 by containing therein a fluted sleeve 18, whose cross-sectional characteristics are revealed in FIG. 4, which sleeve makes it possible for the size AA cell to be properly accepted in an adapter that is basically configured to receive a size C cell. More particularly, the interior of sleeve 18 is configured to receive the AA cell 17, whereas the exterior is of a size to be easily received in the interior of case 16. In the interests of lightness and economy, the exterior of the sleeve 18 may utilize fluting or vertical ribs 18a, with these members providing direct mechanical contact with the interior of the adapter 16. The ends of the sleeve 18 are open, thus not inhibiting the arrangement provided in the adapter for assuring electrical contact between each battery and the contact terminals of the adapter.

Turning to FIG. 5, it will there be seen I have shown the adapter 14 in considerable detail, including the use of a lower contact 24 in the bottom of the base portion 14a, and an upper contact 26 in the cap portion 14b. Both of these contacts are preferably on the longitudinal centerline of the case.

Figure 6:
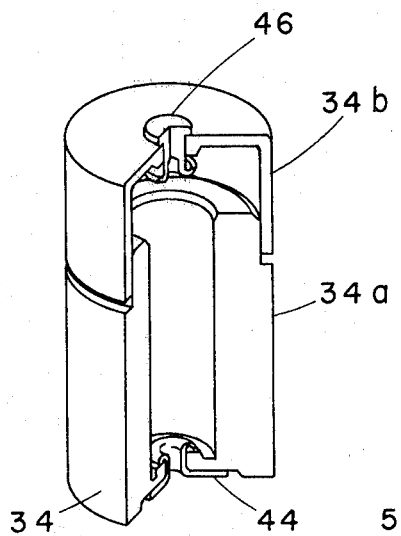
FIG. 6 is a perspective view, with a portion removed, of an adapter of the type utilized when a size AA drycell is to be used in a location ordinarily requiring the use of a size D drycell.

In FIG. 6 I illustrate an adapter case 34 particularized for use with size AA batteries, involving a lower or base member 34a, and a cap portion 34b. Quite obviously, by the use of this type of adapter, it is possible for a size AA battery to be used in locations normally requiring a size D drycell. The terminals 44 and 46 correspond to terminals 24 and 26 in FIG. 5.

It is important to realize that an adapter in accordance with this invention must provide appropriate electrical interconnections between the battery it contains, and the inner electrical portions of the flashlight or other device in which such adapter or adapters are disposed. In the interests of effectiveness and economy, I typically make the adapter units out of plastic or other lightweight, nonconductive materials, and use contact members in the nature of metal eyelets or rivets in the top and bottom locations. In the embodiment shown in FIG. 5, it may be seen that lower contact 24 is firmly fastened in the bottom of the principal case portion 14a, with this metallic component providing an electrical path between the bottom of the drycell contained in the case 14, and the bottom contact of the flashlight, which is of course typically a compression spring, as mentioned in connection with FIG. 1. The lower contact 24 may be of substantial size, or in other words, extend over a considerable portion of the bottom of the exterior of the adapter in order to provide adequate contact surface for the spring 13.

Even though one cap member of a given adapter unit is readily interchangeable with another, it may stand up farther away from the shoulder 14c of the base portion of the adapter if it is improperly seated by dropping it or moving it out of position. Therefore, I take precaution to assure electrical continuity at all times by constructing the upper contact to be an eyelet or rivet 26 (FIG. 5) or 46 (FIG. 6) disposed in floating relationship in the center of such cap portion. Inasmuch as this floating contact can move for some distance in either direction along the centerline of the case, the user is assured that the inside portion of this eyelet will make contact with the upper or positive terminal of the battery at all times when the adapter has been put into use. This is because even if the cap of the adapter resides fairly high on the base portion of the adapter, (see FIG. 10), the rivet or upper terminal can drop down and make good electrical contact with the upper terminal of the battery. On the other hand, when the cap portion of the adapter fits down over the base portion of the adapter case for a considerable extent, (see FIG. 9), the upper terminal will of course be pushed upward by the battery, much in the position shown in FIG. 1. This pushed up position of the upper terminal is also intended to be an indication when the cap is properly seated on the base portion of the adapter.

Turning now to FIG. 7, I have there revealed an embodiment in accordance with this invention in which the lower contact 64 is slidably mounted in the base portion of the adapter 54, so as to be movable to a limited extent in the direction of the longitudinal axis of the adapter. In this instance, the upper contact 66 is typically fixed. However, the interior part of the upper contact 66 is encircled by an upstanding shoulder 68 of non-conductive material. This shoulder has an interior diameter larger than the size of the positive terminal of the drycell, and it is dimensioned in such a way as not to interfere with the positive terminal making electrical contact with the terminal 66, as shown in FIG. 7. The slidably mounted lower terminal 64 can of course move along the longitudinal axis of the adapter to compensate for different tightness of fit of the cap on the base of the adapter unit.

It is of consequence to note that the shoulder 68 described in FIG. 7 effectively serves to prevent electrical continuity when the drycell is improperly placed in the adapter, which is the condition depicted in FIG. 8. Although the positive terminal of the battery in this latter figure does make contact with the lower terminal of the adapter, a significant gap exists between the base of the battery and the upper terminal 66 of the adapter as a result of the placement of the shoulder 68. Consequently the adapter in accordance with this embodiment of the invention cannot be used in an improper electrical condition, and the absence of continuity should alert the user that he or she should disassemble the adapter, at which time it presumably will be ascertained that the drycell has been inserted improperly.

In FIGS. 9 and 10, the first-described embodiment of this invention is depicted in two different operative conditions, with FIG. 9 illustrating an instance in which the cap 14b is comparatively loose, and therefore passes a considerable way down toward the shoulder 14c of the lower member 14a. In this circumstance, the upper terminal 26 will be pushed upward by the positive terminal of the battery, with the adapter obviously making good electrical contact with the drycell and being in a position to also make good electrical contact with the flashlight, toy or other apparatus with which it may be used.

On the other hand, FIG. 10 reveals an arrangement in which the cap 14b is a tight fitting cap, that was not seated down far enough toward the shoulder 14c of the lower adapter unit. In this instance, the upper terminal 26 is caused to slide downwardly into firm electrical contact with the positive terminal of the battery. This may take place as a result of gravity, but more likely as a result of the construction of the flashlight or other appliance in which this novel adapter may be used. This is to say, most devices utilizing drycells of this type utilize a conical compression spring analogous to that shown in FIG. 1, and the action of this spring on the base of the adapter unit is sufficient to push the adapter in such a way as to cause, by contact with another adapter unit or the base of the light bulb, the upper contact 26 to make electrical contact with the positive terminal of the battery therein.

It is important to note in these two examples that the total effective length of the adapter device 14 is the same, measuring from the fixed contact in the base of the adapter unit to the upper part of the floating contact, irrespective of the manner in which the cap 14b fits.

I claim:

1. A reusable adapter unit enabling a small size drycell to be used in instances and locations ordinarily requiring a larger drycell, said adapter unit comprising a case of generally cylindrical shape, involving interfitting first and second members serving to provide an enclosure for completely surrounding an inserted drycell, said first member having a hollow interior in which a drycell of comparatively small size can be accommodated, said first member having generally cylindrical sidewalls and an integral end portion, first electrical terminal means disposed in said end portion and serving to form an electrical interconnection between one terminal of an inserted drycell and a first external part of said case, said second member having a portion that can tightly yet removably interfit with the generally cylindrical sidewalls of said first member, and also having an integral end portion in which a second electrical terminal means is disposed, said second terminal means to form an electrical interconnection between the terminal of an inserted drycell of opposite polarity and a second external part of said case, at least one of said terminal means being slidable for a limited extent along the longitudinal axis of said adapter unit, thus assuring electrical continuity between an inserted drycell and said terminal means extending to the exterior of said adapter case, despite possible irregularities in the manner in which said first and second members interfit.

2. The adapter unit as defined in claim 1 in which the terminal in the first end portion is the terminal that is slidable.

3. The adapter unit as defined in claim 1 in which the terminal in the second end portion is the terminal that is slidable.

4. The adapter unit as defined in claim 1 in which the electrical terminal in the second end portion of the adapter is surrounded by a shoulder of non-conductive material, said shoulder having an inner diameter large enough to permit the entry of the positive terminal of a drycell, but effectively preventing the flat base portion of the drycell from making electrical contact with said terminal of the end portion, such arrangement therefore preventing electrical continuity through the adapter unit if the drycell is improperly oriented in the adapter unit.

5. The adapter unit as defined in claim 4 in which the lower terminal of said adapter unit is slidable for a limited extent along the longitudinal center axis of the adapter unit.

6. The adapter unit as defined in claim 1 and which the first and second end portions of said adapter unit are configured to receive a size AA drycell.

7. The adapter unit as defined in claim 1 in which the first and second members of said adapter unit are configured to receive a size C drycell.

8. The adapter unit as defined in claim 1 in which the first and second members of said adapter unit are configured to receive a size C drycell, in combination with a removable sleeve that can be inserted in the adapter unit in order that it can properly accommodate a size AA drycell.

* * * * *